United States Patent
Merrill et al.

(10) Patent No.: US 8,132,442 B2
(45) Date of Patent: Mar. 13, 2012

(54) COMPRESSIBLE CERAMIC SEAL

(75) Inventors: Gary B. Merrill, Orlando, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 501 days.

(21) Appl. No.: 12/366,822

(22) Filed: Feb. 6, 2009

(65) Prior Publication Data
US 2010/0074729 A1 Mar. 25, 2010

Related U.S. Application Data

(60) Provisional application No. 61/098,985, filed on Sep. 22, 2008.

(51) Int. Cl.
*G01N 7/00* (2006.01)
(52) U.S. Cl. .......... 73/19.01; 73/23.2; 428/49; 428/210; 156/89.11
(58) Field of Classification Search ............... 73/19.01, 73/23.2; 428/49, 210; 156/89.11
See application file for complete search history.

(56) References Cited

U.S. PATENT DOCUMENTS

| | | | |
|---|---|---|---|
| 5,043,117 A | 8/1991 | Adachi et al. | |
| 5,074,748 A | 12/1991 | Hagle | |
| 6,709,230 B2 | 3/2004 | Morrison et al. | |
| 6,746,755 B2 | 6/2004 | Morrison et al. | |
| 6,893,214 B2 | 5/2005 | Alford et al. | |
| 7,153,096 B2 | 12/2006 | Thompson et al. | |
| 7,524,577 B2 * | 4/2009 | Bates | 429/66 |
| 2005/0118392 A1 | 6/2005 | Millard et al. | |
| 2007/0214865 A1 | 9/2007 | Nakae et al. | |
| 2007/0272549 A1 * | 11/2007 | Davis et al. | 204/260 |
| 2010/0133348 A1 * | 6/2010 | Peat et al. | 235/492 |
| 2011/0165033 A1 * | 7/2011 | Meschke et al. | 422/211 |

FOREIGN PATENT DOCUMENTS
EP 2052853 A2 4/2009
\* cited by examiner

*Primary Examiner* — Gary F. Paumen

(57) ABSTRACT

A stack of substantially parallel ceramic plates (22) separated and interconnected by ceramic spacers (26, 27) forming a seal structure (20) with a length (L), a width (W), and a thickness (T). The spacers are narrower in width than the plates, and may be laterally offset from spacers in adjacent rows to form a space (28) in a row that aligns with a spacer in another adjacent row. An adjacent plate bends into the space when the seal structure is compressed in thickness. The spacers may have gaps (60, 62) forming a stepped or labyrinthine cooling flow path (66) within the seal structure. The spacers of each row may vary in lateral separation, thus providing a range of compressibility that varies along the width of the seal structure.

18 Claims, 7 Drawing Sheets

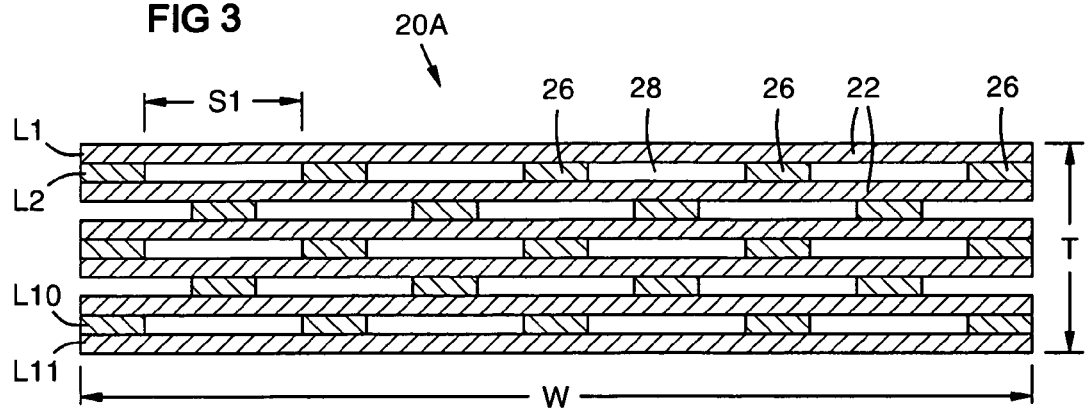
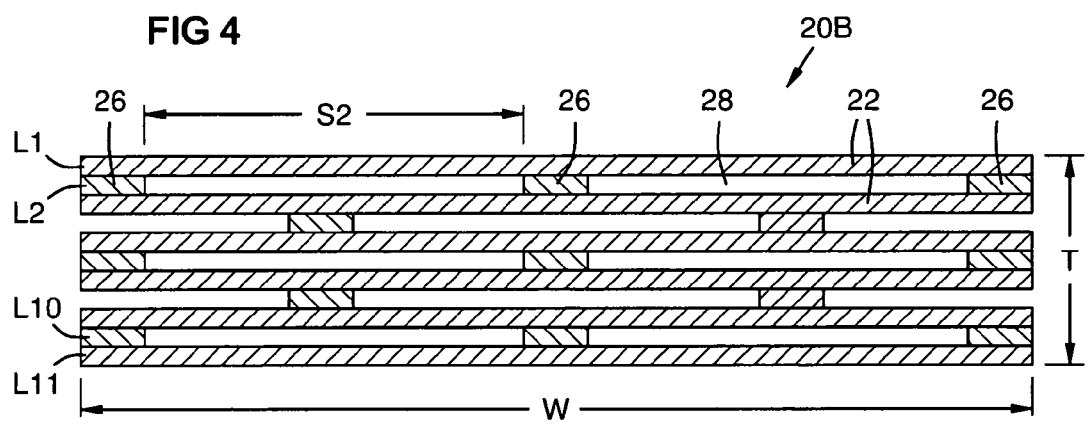
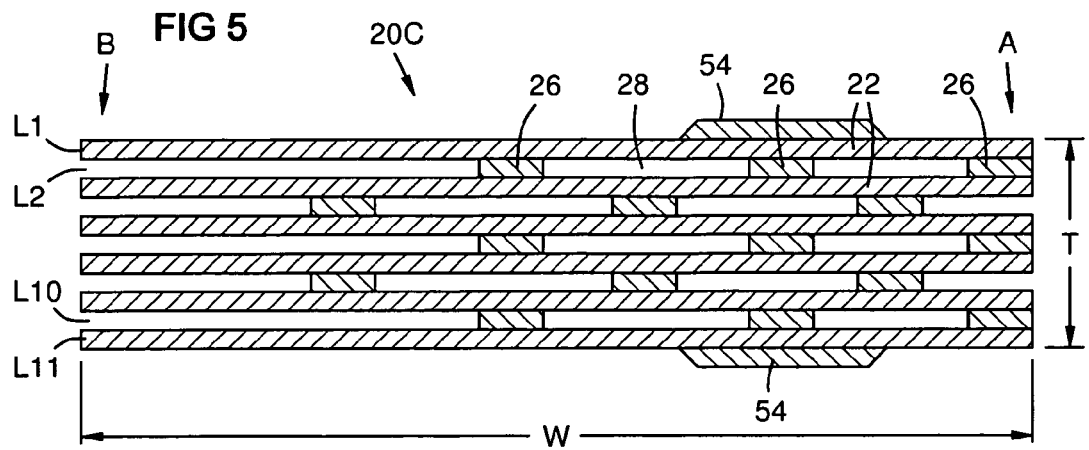

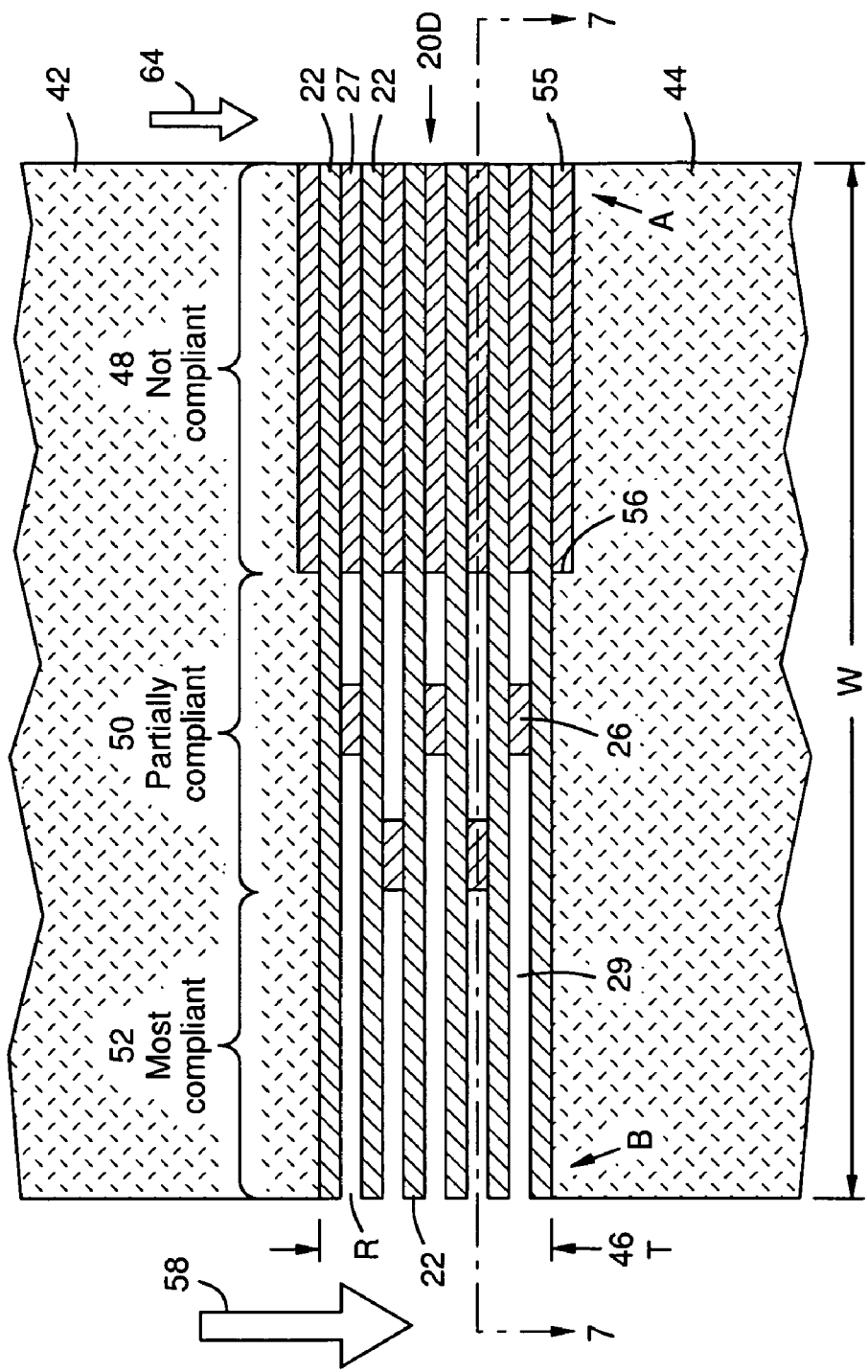

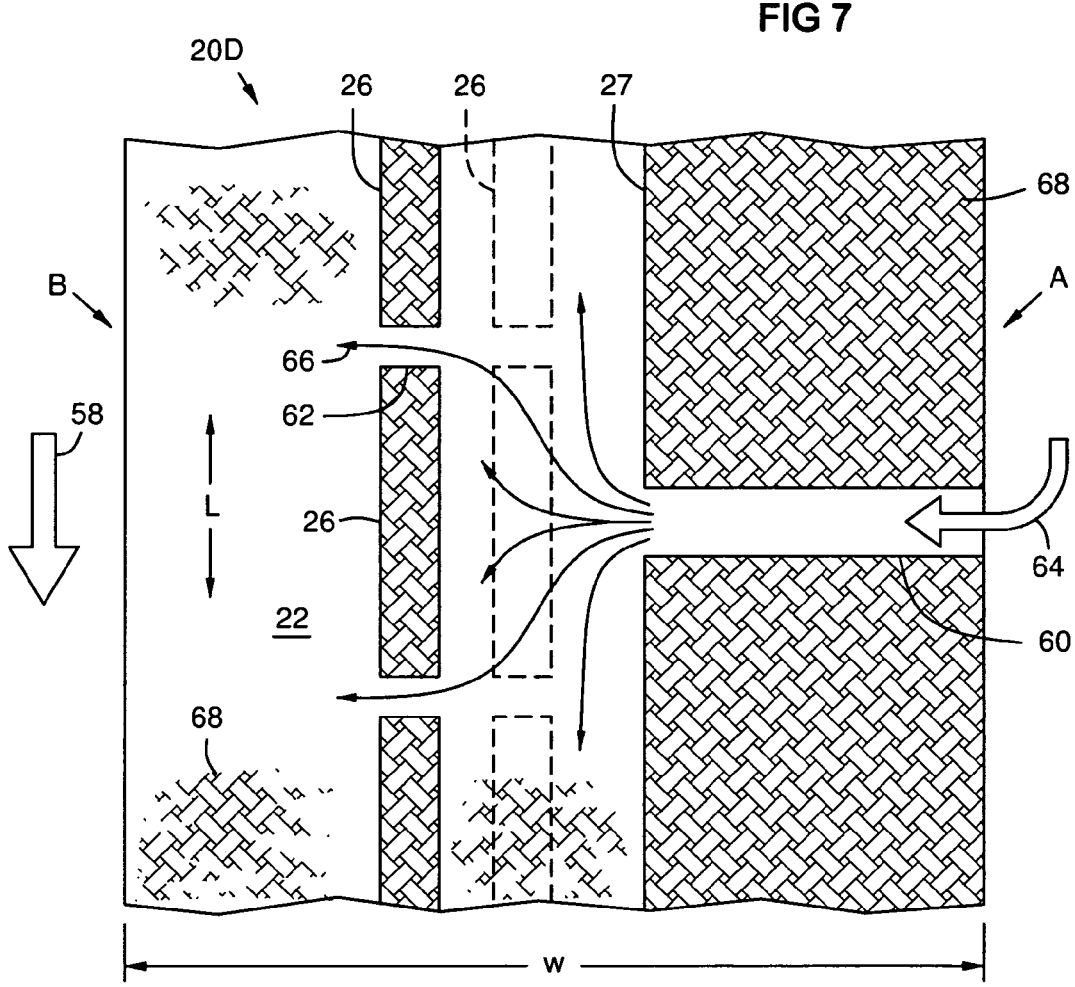

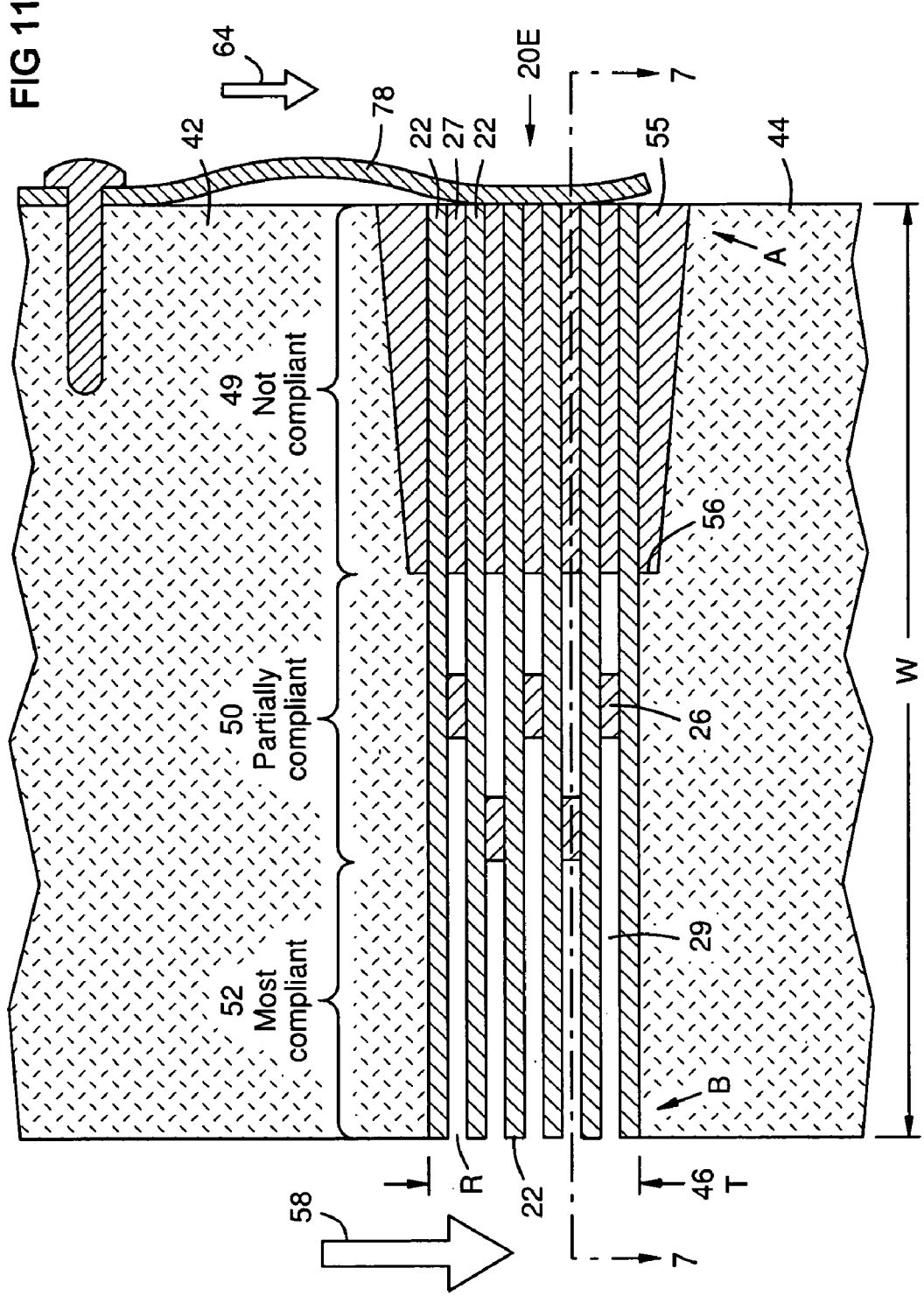

US 8,132,442 B2

COMPRESSIBLE CERAMIC SEAL

This application claims benefit of the 22 Sep. 2008 filing date of U.S. provisional application No. 61/098,985.

FIELD OF THE INVENTION

This invention relates to fluid seals between components subject to thermal expansion, and particularly to seals in gas turbine engines, such as between ceramic matrix composite (CMC) shroud ring segments.

BACKGROUND OF THE INVENTION

Gas turbine engines include a compressor assembly, a combustor assembly, and a turbine assembly. The compressor compresses ambient air, which is then channeled into the combustor, where it is mixed with a fuel. The fuel and compressed air mixture is ignited, creating a working gas that may reach temperatures of 2500 to 2900° F. (1371 to 1593° C.). This gas then passes through the turbine assembly. The turbine assembly has a rotating shaft holding a plurality of circular arrays or "rows" of rotating blades. The turbine assembly also has a plurality of circular arrays of stationary vanes attached to a casing of the turbine. Each row of blades is preceded by a row of vanes to direct the working gas at an optimum angle against the blades. Expansion of the working gas through the turbine assembly results in a transfer of energy from the working gas to the rotating blades, causing rotation of the shaft.

Each row of blades is closely surrounded by a shroud ring that contains and channels the working gas. A pressurize cooling fluid, such as a portion of air from the compressor, is directed against the radially outer surface of the shroud ring ("radially" means relative to a turbine shaft rotational axis). Each shroud ring may be formed of a circular array of adjacent arcuate ring segments. A seal is needed between each pair of adjacent ring segments to prevent the pressurized cooling fluid from leaking inward between the segments, and to prevent the working gas from leaking outward. This is conventionally provided by a metal strip seal mounted in a narrow slot on each side of the gap between ring segments. The strip seal spans the gap, blocking leakage of gas and allows for some differential thermal expansion between adjacent shroud segments.

Each vane includes an airfoil with a radially outer platform connected to the turbine casing. The vane may also have an inner platform connected to an inner coolant plenum. The outer platforms in a given row of vanes are mounted adjacent to each other as segments in a circular array, defining an outer shroud ring. The inner platforms are likewise mounted adjacent to each other in a circular array, defining an inner shroud ring. These outer and inner shroud rings define a flow channel between them which channels the working gas over the stationary vane airfoils. A seal is needed between each pair of adjacent outer platforms, between each pair of inner platforms, as well as between each pair of adjacent shroud rings.

Gas turbines are being designed with ever-increasing working gas temperatures to provide high efficiency. This evolution is enabled by high-temperature component materials such as ceramic matrix composites (CMC) and other ceramics for components exposed to the working gas, including shroud ring segments. Differential thermal expansion between CMC ring segments and metal support structures occurs during a range of turbine operating conditions. This causes cyclic changes in the seal gap size between the ring segments.

Conventional strip seals have clearance in their slot depth to allow expansion and contraction of the gap. Due to the relative brittleness of ceramics compared to metal, such conventional sealing methods are not desirable in ceramics, because relatively narrow and deep seal slots can create stress concentrations that are not well tolerated by ceramics.

BRIEF DESCRIPTION OF THE DRAWINGS

The invention is explained in the following description in view of the drawings that show:

FIG. 3 is a transverse sectional view of a seal structure showing a first lateral separation of spacers, resulting in a first degree of compressibility.

FIG. 4 is a transverse sectional view of a seal structure showing a second lateral separation of spacers, resulting in a second higher degree of compressibility.

FIG. 5 is a transverse sectional view of a seal structure showing a lateral separation of spacers that varies across a width of the seal structure, resulting in a range of compressibility across the width of the seal structure.

FIG. 6 shows a transverse sectional view of a seal structure mounted between gas turbine components.

FIG. 7 shows a sectional view taken along line 7-7 of FIG. 6, illustrating cooling gaps in the seal structure.

FIG. 11 shows a transverse sectional view of a compressible seal structure with a tapered incompressible portion mounted between gas turbine components.

DETAILED DESCRIPTION OF THE INVENTION

The inventors recognized that a better seal for ceramic components in gas turbines would have the thermal tolerance of ceramics, but would also be elastically compressible. Ceramic is normally incompressible, but the present inventors have innovatively conceived a way to manufacture a ceramic seal in such a way that it is elastically compressible in a thickness direction.

Figure 1:
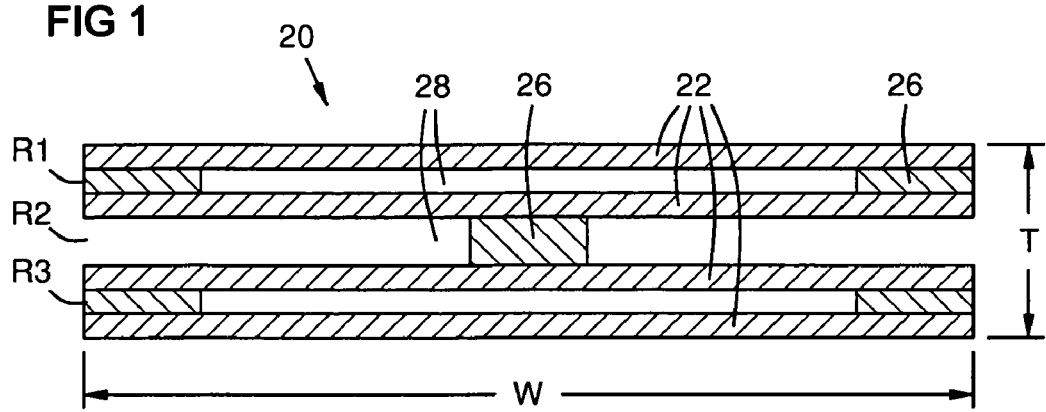
FIG. 1 is a transverse sectional view of a basic seal structure according to aspects of the invention.
Figure 2:
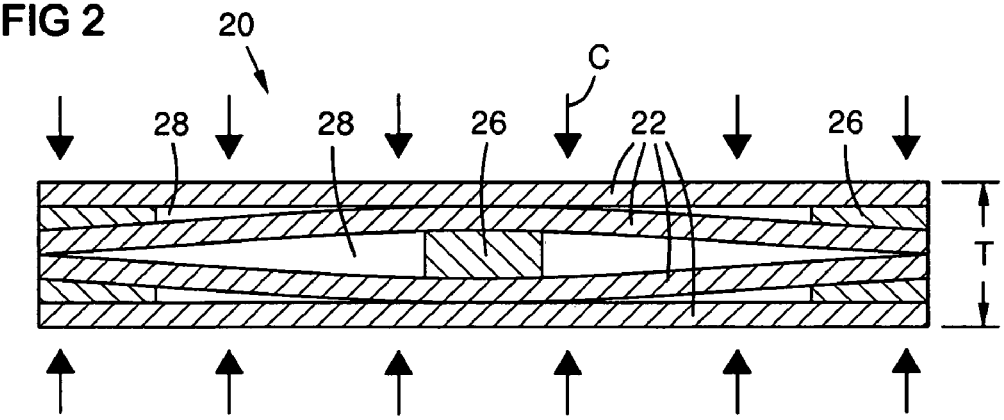
FIG. 2 is a view of the structure of FIG. 1 under compression in thickness.

FIGS. 1 and 2 illustrate an aspect of the invention. A seal structure 20 with a compressible thickness T is formed of a stack of substantially parallel ceramic plates 22 separated and interconnected by ceramic spacers 26. Each pair of adjacent plates 22 is separated by a row R1-R3 of one or more of the spacers. The spacers are narrower in width W than the plates. The spacers 26 may be offset laterally from each other in adjacent rows of spacers R1-R3. This forms a space 28 in rows R1-R3 that aligns with a spacer 26 in an adjacent row. An adjacent plate 22 bends into the space 28 when the seal structure is compressed C in thickness T as shown in FIG. 2.

FIGS. 3-5 illustrate exemplary ways of designing a desired degree of compressibility. FIG. 3 shows a seal structure 20A formed of layers L1-L11, where odd-numbered layers are ceramic plates 22, and even-numbered layers are rows of ceramic spacers 26 that separate and interconnect the plates. In FIG. 3, the spacers of each row have a given lateral separation S1 between spacers. In FIG. 4 a similar structure is illustrated but where the spacers of each row have a greater lateral separation S2 between spacers. The seal structure 20B of FIG. 4 has less resistance to compression in its thickness direction (T) than the seal structure 20A of FIG. 2.

FIG. 5 illustrates a seal structure 20C in which the lateral separation between spacers 26 increases in each row of spacers from a first region A to a second region B of the seal structure 20C. This provides a range of compressibility across the width W of the seal structure, ranging from relatively low compressibility at side A to relatively higher compressibility (more flexible) at side B. This feature may be useful to accommodate a varying thermal expansion profile from a cooled side A to a hot side B. One or more partial layers 54 may be provided on end layers L1, L11 of the seal structure 20C. These partial layers 54 form opposed ridges that extend in the thickness direction to engage corresponding retention grooves in two adjacent turbine components (not shown) to limit movement of the seal structure 20C in the width direction (between sides A and B) between the components.

FIG. 6 illustrates a seal structure 20D mounted in a gap 46 between two gas turbine components 42, 44. The seal structure is partially compressible in its thickness direction T. The separation between spacers 26, 27 of each row of spacers R increases from a first side A to a second side B of the seal structure 20D. This provides a range of compressibility across the width W of the seal-structure, ranging from relatively low compressibility at side A to higher at side B. In this example, a first spacer 27 in each row R is aligned with a first spacer 27 in each of the other rows R along side A of the seal structure. This forms a substantially incompressible part of the seal structure along side A of the seal structure, while the remainder of the seal structure toward the B side is compressible. In the embodiment of FIG. 6 the first spacers 27 are aligned along their entire respective widths, although in other embodiments the spacers of respective rows may be aligned along only some of their respective widths, thereby creating a more gradual change in compressibility at the edge portion of the spacers 27. Side B in this example has no spacers, and is highly compressible. This configuration allows more thermal expansion of the components 42 and 44 on hot side B due to the hot working gas flow 58, while cool side A has less expansion, due to a cooling gas flow 64 provided on side A as known in the art. Three compressibility ranges are shown: non compliant 48; partially compliant 50; and most compliant 52, representing a graded structure in terms of compressibility.

One or more extra layers 55 may be provided on the seal structure 20D that protrude or step in the thickness direction to engage a corresponding retention stop 56 in the gap 46 to stop the seal structure from sliding toward side B. Although a one-sided stop 56 is illustrated, two-sided grooves may alternately be provided corresponding to ridges 54 as in FIG. 5 to stop the seal from sliding toward either side A or B.

FIG. 7 shows a section taken along line 7-7 of FIG. 6 through a row of spacers 26, 27. At least some of the spacers 26, 27 may have one or more transverse gaps 60, 62 spaced along a length L of the seal structure, such that the cooling gas 64 can flow into at least some of the spaces between the plates 22. In this example, the gaps 60, 62 provide a stepwise gas flow path 66 between the first side A and second side B, such that a portion of the cooling gas 64 flows from side A to B through the gaps in the spacers, thus cooling the seal structure and preventing intrusion of the working gas 58. The gaps 62 may be sized as desired to limit or control the coolant flow rate.

The plates 22 and spacers 26, 27 may be made of CMC or other ceramic materials, including oxide CMCs as known in the art of ceramic component fabrication. CMC has ceramic fibers imbedded in a ceramic matrix. The fibers may be woven 68 as shown in FIG. 7. The fibers of each layer 22, 26, 27 may be aligned orthogonally with the length L and width W of the seal (not shown), or they may be crossed diagonally as shown. An advantage of the diagonal geometry is that operational widthwise bending of the spring plates 22 bends all of the fibers, rather than just half of them as occurs in an orthogonal fiber orientation. Likewise, any lengthwise bending of the seal structure during handling bends all of the fibers. Thus, durability is maximized for the two most common bending directions. Alternately the fibers may be unwoven and oriented diagonally or crossed diagonally. The fibers may be oriented differently in the plates 22 and the spacers 26, 27.

Figure 8:
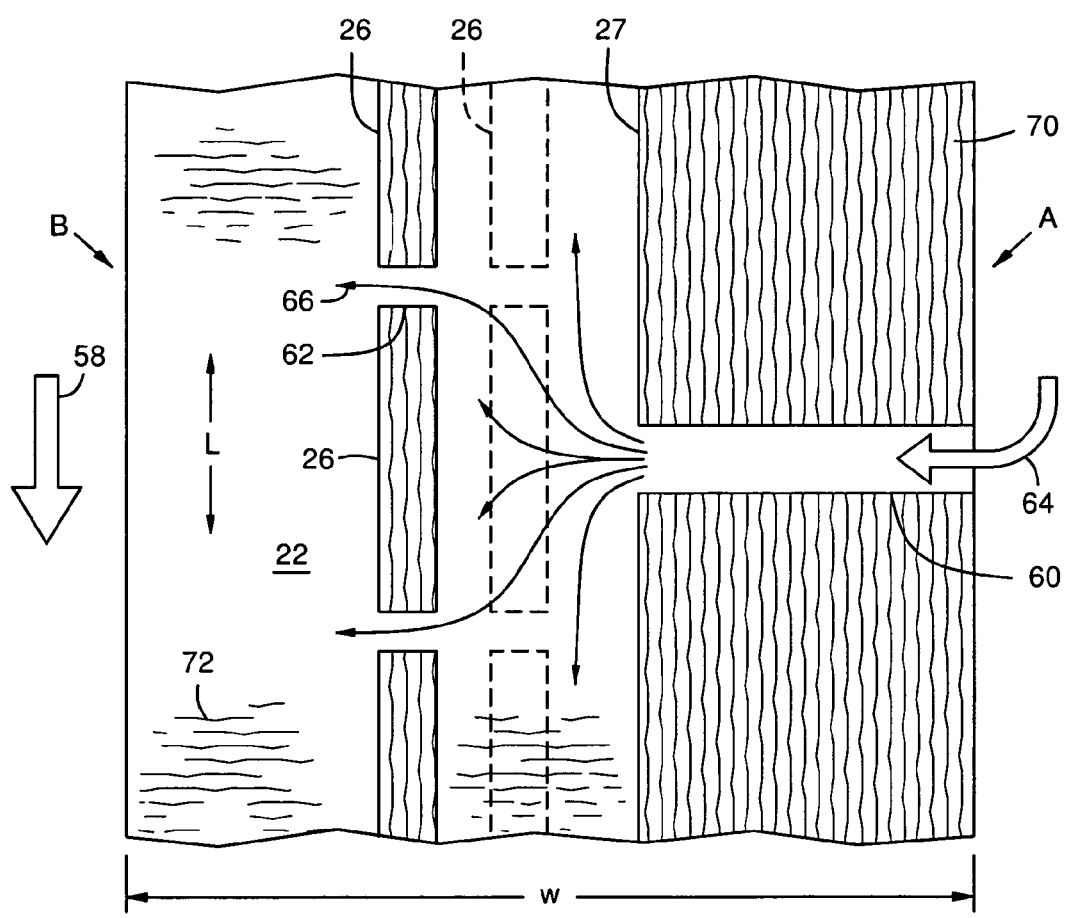
FIG. 8 shows a structure as in FIG. 7 with CMC fibers in an alternate orientation.

FIG. 8 shows unwoven fibers 70, 72 oriented substantially lengthwise in the spacers 26, 27, and substantially widthwise in the plates 22. The fibers of each layer are oriented optimally for the stresses encountered in that layer. The spring plates 22 encounter widthwise bending during operation. The spacers 26, 27 do not bend during operation, so their fibers 70 can be oriented longitudinally to strengthen the seal against breakage during handling and installation.

Figure 9:
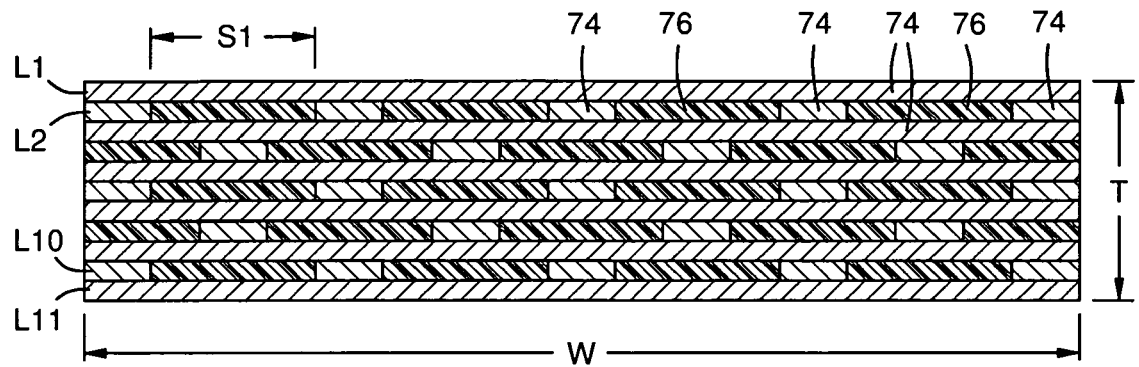
FIG. 9 shows a lay-up stage of fabricating a seal structure according to aspects of the invention.
Figure 10:
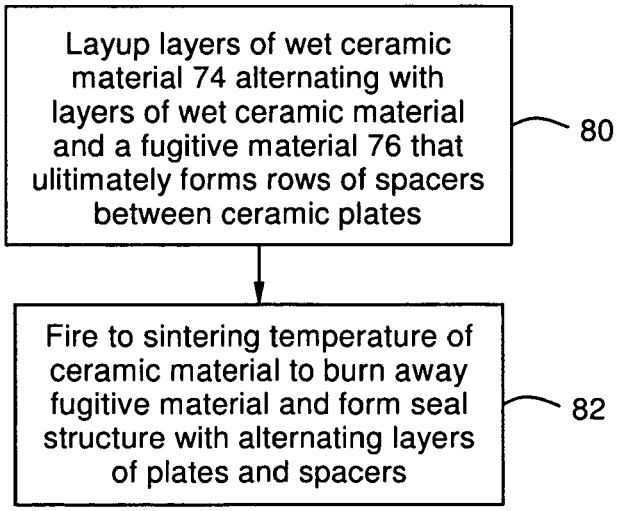
FIG. 10 illustrates a method of fabricating a seal structure according to aspects of the invention.

FIG. 9 shows a fabrication stage of a seal structure, in an exemplary embodiment of the present invention, with layers of a wet ceramic material 74 alternating with layers of wet ceramic material and a fugitive material 76 that thermally decomposes during firing leaving no residual contamination. FIG. 10 illustrates basic steps in a fabrication process including: 80—Lay-up layers of wet ceramic material 74 alternating with layers of wet ceramic material and a fugitive material 76 that will ultimately form rows of spacers between ceramic plates; 82—Fire to a sintering temperature of the ceramic material above a vaporizing temperature of the fugitive material to cure the ceramic material, to remove the fugitive material, and thus to form a seal structure with alternating layers of plates and rows of spacers.

As shown in FIG. 11, an incompressible portion 49 of the seal 20E may be tapered to slide radially outward under compression between the components 42, 44. This allows the incompressible part 49 of the seal to accommodate thermal expansion of the components 42, 44. The seal 20E is normally urged radially inward by differential pressure of the cooling gas 64 over the working gas 58. It may further be retained by a spring 78 attached to one of the components 42, 44, or to a component support structure (not shown). Under compression, the seal will be slightly displaced radially. A solid lubricant such as hexagonal boron nitride (h-BN) may be applied between the seal 20E and the components 42, 44, and/or may be integrated into the material of those components.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A compressible seal, comprising:
   a stack of substantially parallel ceramic plates separated and interconnected by ceramic spacers, thus forming a seal structure with a length, a width, and a thickness normal to the plates;
   at least some adjacent ones of the plates being separated by a respective row of one or more of the spacers;
   wherein the spacers are narrower in width than the plates to define spaces in each row of spacers;
   wherein at least some of the spacers are aligned in the thickness direction with an adjacent space in an adjacent row of the spacers, and each spacer bends an adjacent plate into the adjacent space when the seal structure is compressed in thickness.

2. The compressible seal of claim 1, wherein the ceramic plates are made of a ceramic matrix composite material comprising ceramic fibers in a ceramic matrix.

3. The compressible seal of claim 2, wherein the ceramic fibers of the plates are oriented generally widthwise.

4. The compressible seal of claim 3, wherein the ceramic spacers are made of a ceramic matrix composite material comprising ceramic fibers in a ceramic matrix, and the ceramic fibers of the spacers are oriented substantially lengthwise.

5. The compressible seal of claim 2, wherein the ceramic fibers of the plates are oriented diagonally or crossed-diagonally.

6. The compressible seal of claim 1, wherein the seal structure is mounted between two components in a gas turbine, separating a cooling gas on a first side of the components from a hot gas on a second side of the components, and wherein at least some of the spacers define one or more transverse gaps along the length of the seal structure, such that a portion of the cooling gas can flow into at least some of the spaces between the plates.

7. The compressible seal of claim 6, wherein at least some of the rows of spacers provide a stepwise gas flow path between the first and second sides of the components through the gaps, wherein a portion of the cooling gas flows from the first to the second side of the components through the stepwise gas flow path, thus cooling the seal structure.

8. The compressible seal of claim 1, wherein a lateral separation between adjacent spacers within at least one row varies along the width of the seal structure, such that the seal structure has a range of compressibility that varies along the width of the seal structure.

9. The compressible seal of claim 1, wherein lateral separation between adjacent spacers of at least one row increases from a first to a second side of the seal structure, such that the seal structure has a range of compressibility from relatively low compressibility at the first side to higher at the second side of the seal structure.

10. The compressible seal of claim 1, wherein a first spacer in each row is aligned with a first spacer in each of the other rows for at least part of its width along a first side of the seal structure, thus forming a substantially incompressible part of the seal structure along the first side of the seal structure, while the remainder of the seal structure is compressible.

11. The compressible seal of claim 10, wherein a lateral separation between adjacent spacers within each row varies along the width of the remainder of the seal structure, such that the seal structure has a range of compressibility that varies along the width of the seal structure.

12. The compressible seal of claim 11, wherein the lateral separation between the spacers of each row increases from the first side to a second side of the seal structure, such that the seal structure has a range of compressibility from substantially no compressibility at the first side to compressible at the second side of the seal structure.

13. The compressible seal of claim 10, wherein the substantially incompressible part of the seal structure is tapered to slide radially outward under compression between the components.

14. A method of fabricating the compressible seal of claim 1, comprising:
forming a stack of layers from 1 to N of a wet ceramic material, wherein some of the layers of the wet ceramic material comprise inclusions of a fugitive material with a vaporizing temperature that is lower than a sintering temperature of the wet ceramic material;
heat-curing the stack of layers above the vaporizing temperature of the fugitive inclusions to cure and sinter the ceramic material, thus forming and integrating the seal structure.

15. A compressible seal, comprising:
a stack of substantially parallel ceramic plates separated and interconnected by ceramic spacers, thus forming a seal structure with a length, a width, and a thickness normal to the plates;
each pair of adjacent ones of the plates separated by a row of one or more of the spacers;
wherein the spacers are narrower in width than the plates, and the spacers are laterally non-overlapping with each other in adjacent rows of spacers, forming a space in each row of spacers that is wider than, and aligns with, a spacer in an adjacent row, such that an adjacent plate bends into the space when the seal structure is compressed in thickness; and
wherein at least some of the spacers have one or more transverse gaps along the length of the seal structure, such that a cooling gas can flow from a first side of the seal structure into at least some of the spaces between the plates.

16. The compressible seal of claim 15, wherein at least some of the gaps form a stepwise gas flow path through the width of the seal structure by virtue of the gaps being offset from each other lengthwise in adjacent spacers of a given row.

17. The compressible seal of claim 16, wherein a lateral separation between adjacent spacers within each row varies along the width of the seal structure, such that the seal structure has a range of compressibility that varies along the width of the seal structure.

18. A compressible seal for fluids, comprising:
a stack of odd-numbered ceramic layers from 1 to N, separated by even numbered layers from 2 to N−1, wherein each even-numbered layer comprises one or more spacers separating and connecting two adjacent odd numbered layers, thus forming a seal structure, wherein each even-numbered layer further comprises one or more spaces between said two adjacent odd-numbered layers;
wherein at least some of the spacers push against and bend an adjacent odd-numbered layer into one of the air spaces when the seal structure is compressed in a direction normal to the layers.

\* \* \* \* \*